Nov. 5, 1940.  D. M. WILLIAMSON  2,220,808
AIR CONDITIONING SYSTEM
Filed Oct. 25, 1937
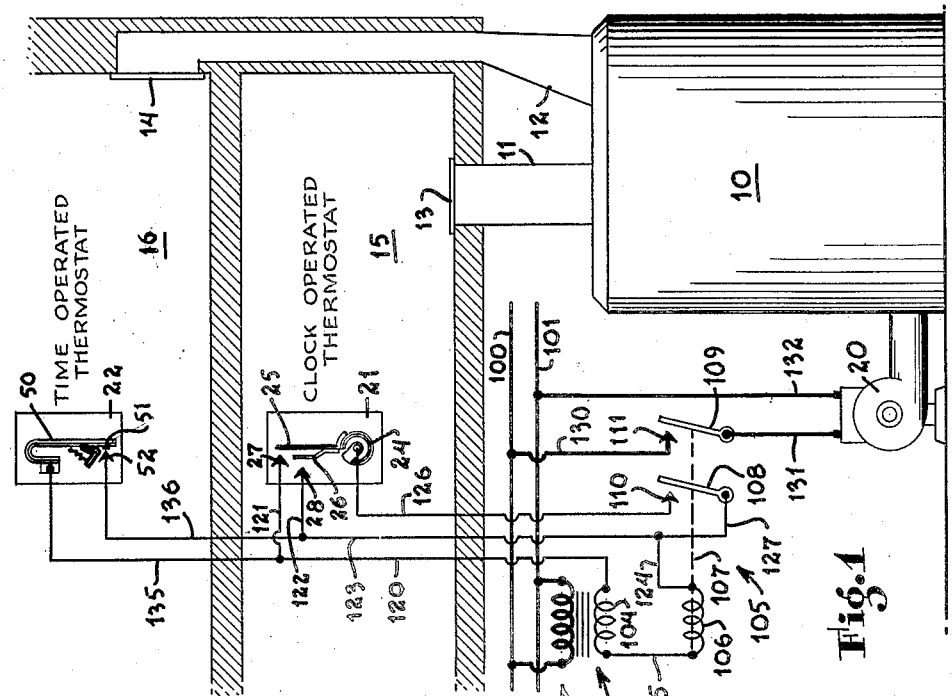
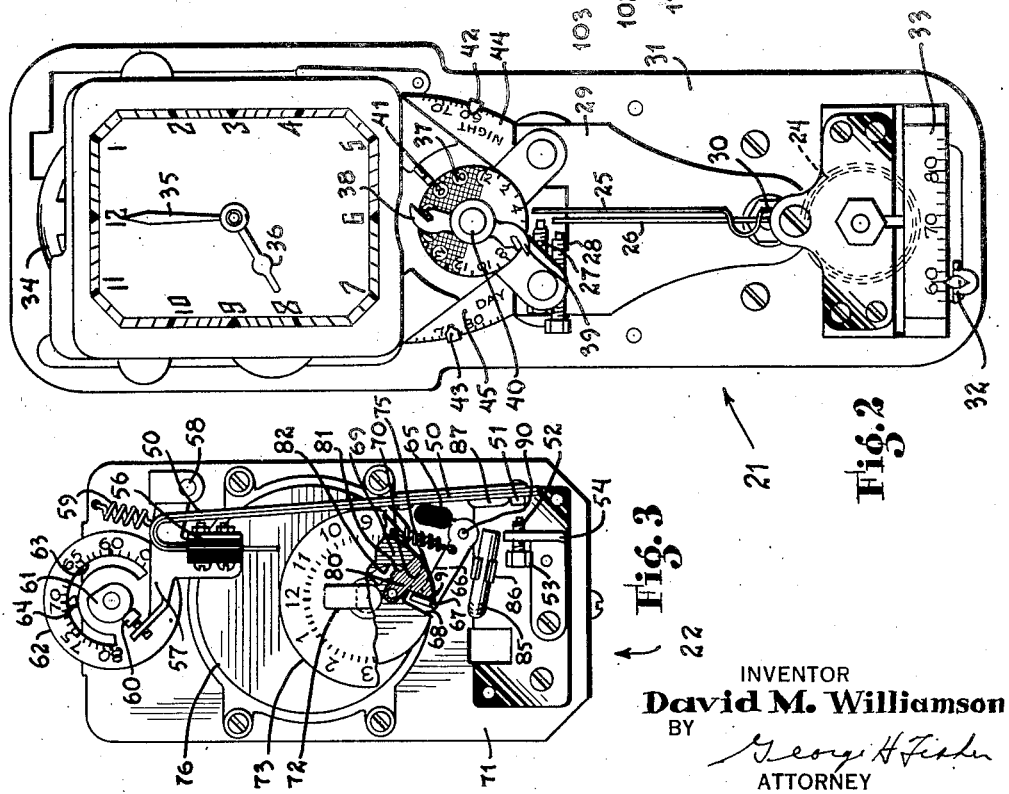
INVENTOR
David M. Williamson
BY
George H Fisher
ATTORNEY Patented Nov. 5, 1940

2,220,808

UNITED STATES PATENT OFFICE 2,220,808

AIR CONDITIONING SYSTEM

David M. Williamson, Baltimore, Md., assignor to Minneapolis-Honeywell Regulator Company, Minneapolis, Minn., a corporation of Delaware Application October 25, 1937, Serial No. 170,787

9 Claims. (Cl. 236—46)

This invention relates to an air conditioning system, and while it is described more particularly in connection with a heating system, it is to be understood that it is equally applicable to other types of air conditioning systems.

The invention is designed as an improvement over the well known type of heating system wherein a clock operated thermostat controls a heating plant to maintain a predetermined temperature in a space for one predetermined period of time, and to maintain a different temperature in the space during another predetermined period of time.

It often happens that in such a system, it may be desired to maintain a higher temperature than that called for by the clock thermostat for a certain period of time, and at the end of that period to have the temperature lowered to that called for by the clock thermostat during that period. For example, assume a store, and a lodge hall located thereover, are heated by a central heating plant, the lodge hall being infrequently used. The store may be equipped with a clock thermostat so that during the hours the store is open, say from 7 a. m. to 6 p. m., a temperature of say 72° will be maintained, and during the closed period of the store or from 6 p. m. to 7 a. m. for example, the thermostat is automatically adjusted to maintain a temperature of, say 60°. If the lodge hall over the store is to be used on a particular night it will be desired to maintain, during the period the lodge hall is used, a temperature which is higher than that which is called for by the clock thermostat located in the store. In the existing systems, it would be necessary to change the setting of the clock thermostat during the time that the lodge hall is used, and at the end of that time to reset the clock thermostat so that it will function normally. In order to obviate the necessity of adjusting the clock thermostat on these occasions, which may entail a considerable amount of annoyance, particularly if the thermostat is located in the store and since readjustment of the thermostat is necessary at the end of the time that the lodge hall is used, I provide an additional thermostat which may assume control of the heating plant during this period.

This thermostat is designed to be operative only when a higher temperature than that called for by the clock thermostat is desired to be maintained and at the end of a predetermined period, to automatically become inoperative whereupon the heating plant is again under the control of the clock thermostat only.

One of the objects of the invention is therefore to provide an improved control means for an air conditioning system.

Another object is to provide an improved time operated thermostat for controlling a clock thermostat.

More specifically it is an object of my invention to provide, in a heating system normally controlled by a clock thermostat to maintain different temperatures during different periods of the day, a second normally inoperative thermostat, which for a predetermined period may assume control of the heating plant to maintain a predetermined high temperature during a period when the clock thermostat is maintaining a lower temperature.

Further objects will become apparent upon an examination of the specification and claims and the accompanying drawing, wherein like reference characters indicate similar parts in the various views, and in which Figure 1 shows a diagrammatic view of a heating plant controlled by a clock operated thermostat and a time operated thermostat, Figure 2 is a view of the clock operated thermostat with the outer cover removed, and Figure 3 is a plan view of a time operated thermostat, certain parts being cut away to better show the construction thereof.

In Figure 1 a heating plant is designated by the reference character 10 and includes warm air ducts 11 and 12 leading to registers 13 and 14 respectively located in spaces 15 and 16. A conventional oil burner 20 is provided for heating the furnace 10, this oil burner being under the control of a clock operated thermostat 21 and a time operated thermostat 22, as will be more particularly pointed out later.

The clock operated thermostat 21, as shown more particularly in Figure 2, is of the type which is clearly described in the patent to A. G. McNicoll 2,041,363, May 19, 1936. This thermostat comprises a bimetallic element 24 to which are connected blades 25 and 26 for movement thereby in response to temperature changes in the atmosphere surrounding the thermostat. Blades 25 and 26 cooperate with relatively fixed contacts 27 and 28, respectively, these contacts being adjustably mounted on a plate 29, said plate being pivoted at 30 to a supporting base 31. Plate 29 may be manually adjusted about pivot 30 to vary the spacing between contacts 27 and 28 and blades 25 and 26 whereby the blades engage their respective contacts in response to varying degrees of temperature.

Means are provided for automatically adjusting the relative positions of contacts 27 and 28 with respect to the blades 25 and 26 at predetermined intervals, whereby the thermostat is responsive to different temperatures at different times during the day. This means comprises an electric motor 34, which drives through suitable reduction gearing clock hands 35 and 36, and a disc 37, this disc being suitably geared to the motor so that it makes one complete revolution during a twenty-four hour period. This disc is graduated into twenty-four parts designating hours of the day, the unshade portion indicating daytime, and the shaded portion indicating nighttime. Mounted for rotation with disc 37, are cams 38 and 39, these cams being adjustably secured to the disc by means of a nut 40. Located in the path of movement of cams 38 and 39 is one end of a lever 41, which lever is mounted for radial movement with respect to the disc 37. As the cams move past lever 41 they cause the lever to move away from the disc and means are provided for moving the lever back into the path of movement of the cams after they have passed the same. Movement of lever 41 causes plate 29 to be moved either toward the right or the left about pivot 30 a predetermined amount, whereby the spacing of contacts 27 and 28 with respect to blades 25 and 26 is periodically varied. The means for causing this movement is clearly illustrated and described in the above mentioned McNicoll patent, and since this means forms no part of the present invention it is not being fully described here.

The amount of movement imparted to plate 29 by the actuation of lever 41 is varied by suitable mechanism illustrated in the McNicoll patent, pointers 42 and 43 being provided for causing said adjustment, these pointers being designed to sweep across graduated dials 44 and 45, whereby the temperature that will be maintained by reason of the adjustment may be ascertained.

With the parts in the position illustrated in Figure 2 cam 38 causes lever 41 to effect movement of plate 29, and with it contacts 27 and 28 to a position wherein the thermostat is responsive to a temperature of 60°, as noted by the position of pointer 42 on dial 44. The other cam 39 is positioned so that at 7 a. m. lever 41 will again be moved to effect movement of plate 29 to move contacts 27 and 28 toward the right, or to a position in which the thermostat is responsive to a temperature of 72°, as ascertained by the position of pointer 43 on dial 45.

It will thus be seen that this thermostat is responsive to a temperature of 60° between the hours of 6 a. m. and 7 p. m. and to a temperature of 72° between the hours of 7 a. m. and 6 p. m. The temperatures maintained during either of these two periods may be varied by moving the position of pointers 42 or 43, and the time that the change from the low to the high setting or vice versa is made, may be varied by moving cams 38 and 39 with respect to disc 37.

The time operated thermostat 22 is shown in detail in Figure 3. This thermostat comprises a bimetallic element 50 having at its lower portion a contact 51 designed to coact with a relatively fixed contact 52 mounted on the end of a screw threaded member 53 which is in turn mounted in a post 54. The upper end of the bimetallic element 50 is mounted in a block 56 formed of a suitable insulating material, said block being mounted on a lever 57 pivoted at one end to a plate 71 at 58. The other end of lever 57 is provided with an adjustable bolt 60, and a spring 59 connected to the lever intermediate its ends tends to move the same upwardly about pivot 58. For adjusting the position of lever 57 about its pivot 58, a cam 61 is provided which coacts with the bolt 60, said cam being rotated by a manually operated wheel 62, said wheel carrying graduations 63 which coact with a pointer 64, these graduations indicating the temperature at which the temperature responsive element 50 operates to move contact 51 against contact 52. It will readily be seen that as cam 61 is rotated the position of lever 57 is varied, and likewise the position of bimetallic element 50 and its contact 51 is varied with respect to the fixed contact 52.

Contact 51 is normally held out of engagement with contact 52 by means of a stop 65 formed of a suitable insulating material, said stop being carried at one end of a bell-crank lever 66 pivoted at 90, the other end of which terminates in a turned up portion 67 normally located in a recess 68 of a disc member 69 said recess having a cam surface 70. A spring 75 exerts an upward movement of the end 67 of lever 66, thereby forcing stop 65 against the bimetallic element 50, whereby contact 51 is maintained out of engagement with contact 52.

For retracting the stop 65 from the bimetallic element 50, the disc member 69 is rotated in a clockwise direction, whereupon the upturned portion 67 of lever 66 rides on the cam surface 70 of disc 69, thereby moving the lever 66 about its pivot 90 against the action of spring 75, whereby stop 65 is moved inwardly and out of engagement with the bimetallic element 50. For effecting the movement of disc 69, a knob 72 is provided, and a disc 73 is secured thereto for movement therewith. This disc 73 is in the form of a graduated dial as illustrated, for a purpose to be later described. The knob 72 operates a suitable clock mechanism designated generally by the reference character 76 and when said knob is turned in a clockwise direction the clock mechanism is wound up and operates to move the knob 72 back to the position illustrated, the clock mechanism being connected to knob 72 so that one complete revolution is imparted to the knob and its dial in a twelve-hour period.

Each number on dial 73 represents one hour, so that if the dial is turned by the knob from the position illustrated to a position where the numeral three appears at the top thereof, it will take a three-hour period for the dial to be moved back to its original position by the clock mechanism.

Carried by the disc 69 is a pivoted latch 80 having a down-turned portion 81 positioned in a groove 82 in said disc, said groove limiting the downward movement of said latch to the position illustrated. When the disc 69 is rotated in a clockwise direction by means of knob 72, the upturned portion 67 of lever 66 rides on cam surface 70 of the disc until it rides on the periphery thereof. As said disc is moved in a counter-clockwise direction by the clock mechanism back to the portion illustrated, the latch 70 is moved back to its original position, and the upturned portion 67 of lever 66 rides on the outer curved portion of this latch until it reaches portion 91 thereof, whereupon it is moved abruptly by spring 75 back to its original position. This is for the purpose of causing a quick movement of stop 65 to a position illustrated so that the bimetallic element 50 is abruptly moved away from contact 52 and not gradually so. A permanent magnet 75

85 is mounted in brackets 86 and mounted on the bimetallic element is a piece of steel 87 which is attracted by said magnet to cause a snap action of the thermostat when contact 51 is moved near contact 52. It will therefore be apparent that a slightly higher temperature is required to break the contacts than is required to make them, which prevents fluttering of the thermostat and too frequent stopping and starting of the oil burner.

It is believed that the operation of this thermostat will now be apparent. In the position of the parts as illustrated, stop 65 prevents engagement of contacts 51 and 52 regardless of the existing temperature. When the knob 72 is moved clockwise through 90° for example, the numeral 3 is located where numeral twelve is now shown. The up-turned portion 67 of lever 66 is now resting on the periphery of disc 69 and stop 65 is withdrawn from engagement with bimetallic element 50, so that upon a drop in temperature of the surrounding atmosphere to 70° the contacts 51 and 52 may be moved into engagement with one another and the thermostat will operate to maintain a temperature of 70° until the parts have returned under the influence of the clock mechanism 76 to the position illustrated, this requiring a period of three hours, after which the stop 65 is again moved against the bimetallic element 50 to maintain contacts 51 and 52 out of engagement with one another. It will be understood that the temperature to which the thermostat responds is readily adjusted by moving cam 61 through the wheel 62, and the length of time that the thermostat is operative is determined by the position to which knob 72 is turned. The operating structure of this thermostat is similar to that shown and described in the application of Carl G. Kronmiller Serial No. 98,326 filed August 28, 1936, Patent 2,172,820, Sept. 12, 1939.

For supplying power to the system, a suitable line 100, 101 is provided, said line being connected to a suitable source of power. For controlling the operation of the oil burner a relay generally designated by the reference character 105 is provided, this relay comprising a coil 106, an armature 107 and switch blades 108 and 109 coacting with fixed contacts 110 and 111. For energizing coil 106, a step-down transformer 102 is provided, this transformer comprising a high tension coil 103 connected to lines 100, 101 and a low tension coil 104.

Operation

Assume that the thermostats 21 and 22 are adjusted as shown in Figures 2 and 3. Thermostat 22 is inoperative by reason of position of stop 65, and thermostat 21 is in control of the oil burner 20, closing a circuit therethrough when the temperature in the space 15 falls below 60°.

Assume that the temperature has fallen below 60°, blades 25 and 26 are in engagement with contacts 27 and 28. Blade 25 engages contact 27 at a slightly higher temperature than that which causes blade 26 to engage contact 28. No circuit is energized through the oil burner until both blades are in engagement with their respective contacts. When this condition exists relay coil 106 is energized through the following circuit: from low tension coil 104 through conductors 120, 121, contact 27, blades 25 and 26, contact 28, conductors 122, 123, 124, through the coil 106 and conductor 125 to the other side of transformer coil 104. Energization of coil 106 causes switch blades 108 and 109 to move into engagement with contacts 110 and 111, respectively. Engagement of switch blade 108 with contact 110 energizes a holding circuit for the relay coil 106, which circuit is independent of blade 26 of thermostat 21 so that the relay coil is not deenergized until both thermostat blades have moved away from their respective contacts. This holding circuit through the relay coil 106 is as follows: from the transformer coil 104 through conductors 120, 121, contact 27, blade 25, bimetallic element 24, conductor 126, contact 110, switch blade 108, conductors 127, 124 through the relay coil 106 and conductor 125 to the other side of transformer coil 104. When switch blade 109 is moved into engagement with contact 111 a circuit through the oil burner 20 is energized as follows: from the line 100 through conductor 130, contact 111, switch blade 109, conductor 131 through the oil burner motor and conductor 132 back to the line 101. Heat is now supplied to the spaces 15 and 16 and the oil burner continues in operation until the thermostat 21 is completely satisfied by the moving of switch blades 25 and 26 away from their respective contacts.

Thermostat 21 controls the operation of oil burner 20 to maintain a temperature of 60° until such time as the setting of the thermostat is changed by the moving of cam 39 past lever 41, which change occurs, with the thermostat adjusted as illustrated in Figure 2, at 7 a. m. At 7 a. m. the thermostat is automatically adjusted to maintain a temperature of 72° and continues to maintain this temperature until the cam 38 is moved around and operates lever 41, which occurs at 6 p. m. with the thermostat adjusted as illustrated in Figure 2. During all this time it will be understood that thermostat 22 is inoperative and has no effect whatever upon the heating system.

Assume the time is 8 p. m. as illustrated in Figure 2, and thermostat 21 is set to maintain a temperature of 60° in space 15. If it is now desired to raise the temperature in space 16 to 72°, for example, and keep the temperature at this point until midnight for example, it is merely necessary to rotate knob 72 of thermostat 22 until the numeral four on dial 73 is moved to the position in which numeral twelve is shown in Figure 3. This causes thermostat 22 to become operative for four hours, after which time it is again inoperative and has no effect on the oil burner. If the dial 62 is moved so that a temperature of 72° is indicated thereon, thermostat 22 will control the oil burner to maintain such a temperature in space 16. If the temperature in said space is below 72°, as would be the case if the thermostat were put into operation at 8 p. m., thermostat 21 being set as illustrated, contacts 51 and 52 are caused to engage by reason of bimetallic element 50, and a circuit through the relay 105 which is independent of thermostat 21 is energized as follows: from the low tension coil of the transformer 102 through conductors 120, 135, bimetallic element 50 of thermostat 22, contacts 51 and 52, conductors 136, 123, 124, relay coil 106, and conductor 125 to the other side of transformer coil 104. Energization of relay coil 106 causes switch blade 109 to move into engagement with contact 111, thereby energizing the oil burner motor 20 as described above.

It is therefore apparent that while thermostat 22 is in operation, if it is set to maintain a higher temperature than thermostat 21 it will do so irrespective of the setting of thermostat 21.

It will be seen that I have devised a very convenient and easily operated system normally controlled by a clock thermostat to maintain different temperatures in the space during different periods of the day, and an independently operated means for maintaining during a predetermined portion of the day, a temperature higher than that called for by the clock thermostat, and in which the clock thermostat automatically resumes control of the heating system at the end of the last mentioned predetermined portion of the day. The means for taking the control of the system away from the clock thermostat for a predetermined period of time requires only one simple setting and obviates the necessity of adjusting the clock thermostat when it is desired to maintain for a certain length of time a temperature different from that which it normally maintains. With this done by the clock thermostat, it is obvious at the end of the predetermined period last mentioned, that the clock thermostat would again have to be adjusted in order that it resume normal operation. Also with my improvement the time operated thermostat may be located in a different space from the clock operated thermostat so that, should the space in which the clock operated thermostat be located, as in a store, be locked at the time it is desired to raise the temperature of a different space such as a lodge hall located above the store, it is unnecessary to enter the store or space in which the clock operated thermostat is located to raise the temperature of the other space.

While I have illustrated and described one preferred embodiment of my invention it should be understood that many changes may be made by those skilled in the art, and that my invention is to be limited only by the scope of the appended claims.

I claim as my invention:

1. In an air conditioning system having air conditioning means and means for controlling the air conditioning means to maintain one condition in a space during a predetermined period of time and to maintain a different condition during a second predetermined period, the improvement which consists of a condition responsive element, switching means, means normally mechanically holding the switching means from control by the condition responsive element, means placing the switching means under the control of the condition responsive element for a timed period, and means automatically removing the switching means out of the control of the condition responsive element at the end of the timed period, said condition responsive element and switching means being adapted to maintain a different condition in the space during the timed period from what would otherwise be maintained.

2. In an air conditioning system having air conditioning means and means for controlling the air conditioning means to maintain one condition in a space during a predetermined period of time and to maintain a different condition during a second predetermined period, the improvement which consists of a condition responsive element, a fixed switch contact, a cooperating movable switch contact arranged to be moved by the condition responsive element, holding means normally holding the contacts apart against the action of the condition responsive element, said means being movable to a position wherein the movable contact is under the influence of the condition responsive element, means for causing such movement, and time controlled means for moving the holding means back to its normal position after a predetermined period of time, said switch contacts being connected in a circuit causing operation of the air conditioning means, whereby, when the contacts are under the control of the condition responsive means, a different condition is maintained in the space from what would otherwise be maintained during that time.

3. In a heating system having heating means and means for controlling the heating means to maintain a predetermined high temperature for a predetermined period and to maintain a predetermined low temperature for a second predetermined period, the improvement which consists of a thermostat comprising a temperature responsive element, switching means under the control of said element, means normally holding the switching means open regardless of the temperature of the surrounding air, means placing the switching means under the control of the temperature responsive element for a timed interval, and means automatically removing the switching means from the control of the temperature responsive element at the end of the timed interval, said thermostat being adapted to control the heating means to maintain a higher temperature during the timed interval than would otherwise be maintained.

4. For use in a heating system of the type wherein different predetermined temperatures are maintained in a space by means of a clock thermostat during different periods, a second thermostat, means whereby the second thermostat is manually placed in control of the heating system when desired to maintain a higher temperature in the space than would otherwise be maintained by said clock thermostat, said second thermostat including timing means which operates to remove the thermostat from control of the system after a predetermined time interval.

5. In a heating system, heating means, a thermostat for controlling said heating means, said thermostat comprising a temperature responsive element, electrical contacts actuated thereby, and means for automatically adjusting at predetermined times the position of at least one contact whereby the contacts are closed at different temperatures during different periods to cause the operation of said heating means to maintain different temperatures in the space being heated, a second thermostat comprising a timing means, a temperature responsive element, electrical contacts actuated by said element, holding means normally holding said contacts apart against the influence of the temperature responsive element, means for retracting said holding means whereby the contacts are under the influence of the temperature responsive element and the thermostat is in operation, means connecting the holding means for operation by the timing means whereby the holding means moves back to its normal position after a predetermined length of time, and means connecting the contacts of the thermostats in parallel, so that when the second thermostat is in operation, the closing of the contacts of either thermostat by the respective temperature responsive element causes operation of the heating means, and after the second thermostat is put out of operation by the action of the timing means after a predetermined interval, the heating means is under the control of the first mentioned thermostat only.

6. In a condition control system, a condition changing means, a first condition responsive means for controlling said condition changing means to maintain said condition at a first value, automatic means for adjusting said condition responsive means to control said condition at a second value, a second condition responsive means normally inoperative to affect said condition changing means, and means for placing said second condition responsive means in control of said condition changing means for a predetermined period of time to maintain said condition substantially at said second value while said first condition responsive means is adjusted to maintain said condition at said first value.

7. In a condition control system, a condition changing means, a first condition responsive means having a first adjustment for controlling said condition changing means to maintain said condition at a first value and a second adjustment for controlling said condition changing means to maintain said condition at a second value, continuously operating means for alternately changing said condition responsive means from one adjustment to the other, a second condition responsive means normally in inoperative position, and manual means for rendering said second condition responsive means operative for an arbitrary period of time to control said condition changing means to maintain said condition at said second value while said first condition responsive means is adjusted to maintain said condition at said first value.

8. In a temperature control system, a plurality of spaces to be heated, heating means for said spaces, control means for said heating means, a thermostat in one of said spaces normally in control of said control means, a continuously operated clock for adjusting said thermostat to actuate said control means to maintain a relatively high day temperature and a relatively low night temperature, a second thermostat in another of said plurality of spaces, means normally holding said second thermostat out of control, and manual means for releasing said holding means to render said second thermostat operative to assume control and actuate said control means to maintain a relatively high temperature while said first thermostat is adjusted to otherwise maintain a relatively low night temperature.

9. In a heating system, means for heating one or more spaces, temperature responsive means for controlling said heating means to regulate the temperature in said space or spaces, means for adjusting said temperature responsive means to maintain different predetermined temperatures at different predetermined times, a second means responsive to space temperature, said last named means being normally inoperative to control said heating means but capable of being rendered operative at any desired time to maintain a higher space temperature than that maintained by said first temperature responsive means for any desired period of time.

DAVID M. WILLIAMSON.